(12) United States Patent
Dowden

(10) Patent No.: US 9,808,892 B2
(45) Date of Patent: Nov. 7, 2017

(54) FITTING HOLDING DEVICE

(71) Applicant: Shelley L. Dowden, Lumberton, TX (US)

(72) Inventor: Shelley L. Dowden, Lumberton, TX (US)

(*) Notice: Subject to any disclaimer, the term of this patent is extended or adjusted under 35 U.S.C. 154(b) by 178 days.

(21) Appl. No.: 14/732,109

(22) Filed: Jun. 5, 2015

(65) Prior Publication Data

US 2016/0354874 A1  Dec. 8, 2016

(51) Int. Cl.
*B23K 15/00* (2006.01)
*B23K 37/04* (2006.01)

(52) U.S. Cl.
CPC ................. *B23K 37/0426* (2013.01)

(58) Field of Classification Search
CPC ................. A47J 43/18; A47J 37/041
USPC .......................................... 219/161; 269/312
See application file for complete search history.

(56) References Cited

U.S. PATENT DOCUMENTS

| | | | | |
|---|---|---|---|---|
| 498,984 A * | 6/1893 | Monachesi | ......... | A47J 37/0694 126/14 |
| 1,133,334 A * | 3/1915 | Strycker | .................. | B25B 5/068 269/254 R |
| 1,468,718 A * | 9/1923 | Kneeland | ............... | A47J 43/283 15/210.1 |
| 2,532,406 A * | 12/1950 | Jernigan | .................... | H01J 9/32 294/33 |
| 2,768,856 A * | 10/1956 | Wright | .................. | A47J 43/283 294/33 |
| 3,066,930 A * | 12/1962 | Chinnick | ............... | B23K 3/087 269/4 |
| 3,291,476 A * | 12/1966 | Calkin | .................. | B23K 3/082 228/57 |
| 3,361,468 A * | 1/1968 | Case | ..................... | A47J 43/283 294/118 |
| 3,611,842 A * | 10/1971 | Skipper | .................. | B23K 3/087 269/157 |
| 4,081,170 A | 3/1978 | Doss, Jr. | | |
| 4,212,235 A * | 7/1980 | Snyder | ................ | A47J 37/0694 99/394 |
| 4,462,404 A * | 7/1984 | Schwarz | ................ | A61B 17/10 606/142 |
| 4,611,743 A | 9/1986 | Williams | | |
| 4,691,626 A * | 9/1987 | Shih-Cheng | ........ | A47J 37/0763 99/421 H |
| 4,955,971 A * | 9/1990 | Goulter | .................. | A47J 43/283 294/3 |
| 5,217,464 A * | 6/1993 | McDonald | ............ | A61F 2/1662 24/552 |
| 5,511,717 A | 4/1996 | Uusitalo | | |
| 5,573,229 A | 11/1996 | Lycan | | |
| 5,584,427 A * | 12/1996 | Suaso | ..................... | B23K 9/32 219/74 |

(Continued)

*Primary Examiner* — Thien S Tran

(57) ABSTRACT

A fitting holding device holds an olet fitting in place while tack welding the olet fitting to a pipe. The device includes an elongated rectangular handle with a gripping section and a tapered section. A first rod straight rod extends from the handle. A second rod extends from the handle having a first section is coplanar with the first rod, a second section coplanar with respect to the first section and skewed relative to the first rod, a third section coplanar with the second section and the first section and transverse relative to the first rod defining a gap to engage and hold an olet fitting. A cuff is slidable along a length of the first rod and the first section to adjust tension on the olet fitting positioned between the first rod and the third section of the second rod.

7 Claims, 5 Drawing Sheets

(56) References Cited

U.S. PATENT DOCUMENTS

| | | | | |
|---|---|---|---|---|
| 5,766,189 | A | * | 6/1998 | Matsuno .............. A61B 17/122 |
| | | | | 606/139 |
| 5,839,647 | A | | 11/1998 | Orne |
| 5,887,531 | A | * | 3/1999 | Covill .................... A47B 3/083 |
| | | | | 108/131 |
| 5,934,721 | A | * | 8/1999 | Walde ................ A47J 37/0786 |
| | | | | 294/3 |
| 6,161,296 | A | | 12/2000 | Davio |
| 6,352,293 | B1 | * | 3/2002 | Baschenis ................ B25B 9/02 |
| | | | | 294/902 |
| 6,484,923 | B2 | | 11/2002 | Figueroa-Rivera |
| 6,494,517 | B1 | * | 12/2002 | Durant ................... A47G 21/10 |
| | | | | 294/33 |
| 6,553,898 | B2 | * | 4/2003 | Folkertsma ......... A47J 37/0694 |
| | | | | 99/394 |
| D488,359 | S | * | 4/2004 | Settele ........................... D7/690 |
| 6,991,634 | B2 | * | 1/2006 | Sugiyama ............ A61B 17/122 |
| | | | | 606/142 |
| D526,543 | S | * | 8/2006 | Mullen .......................... D7/686 |
| D535,858 | S | * | 1/2007 | Walker ........................... D7/669 |
| 8,608,774 | B1 | * | 12/2013 | Alshemari .............. A61B 17/30 |
| | | | | 606/210 |
| 2002/0045909 | A1 | * | 4/2002 | Kimura ................ A61B 17/083 |
| | | | | 606/151 |
| 2006/0259049 | A1 | * | 11/2006 | Harada .............. A61B 17/1285 |
| | | | | 606/151 |
| 2009/0243317 | A1 | * | 10/2009 | Li .......................... A47G 21/10 |
| | | | | 294/3 |
| 2013/0000067 | A1 | * | 1/2013 | Xia ........................ A47K 11/10 |
| | | | | 15/210.1 |

* cited by examiner

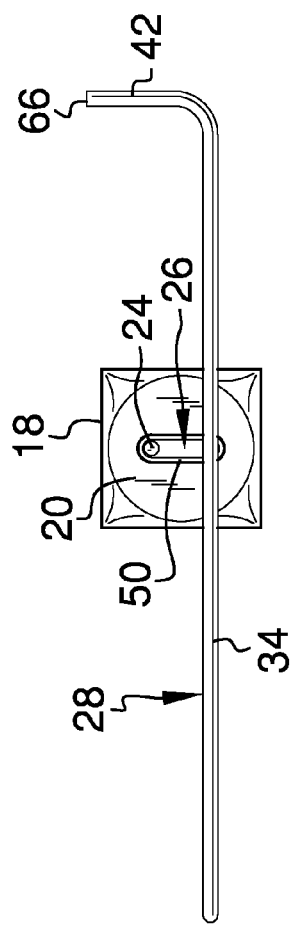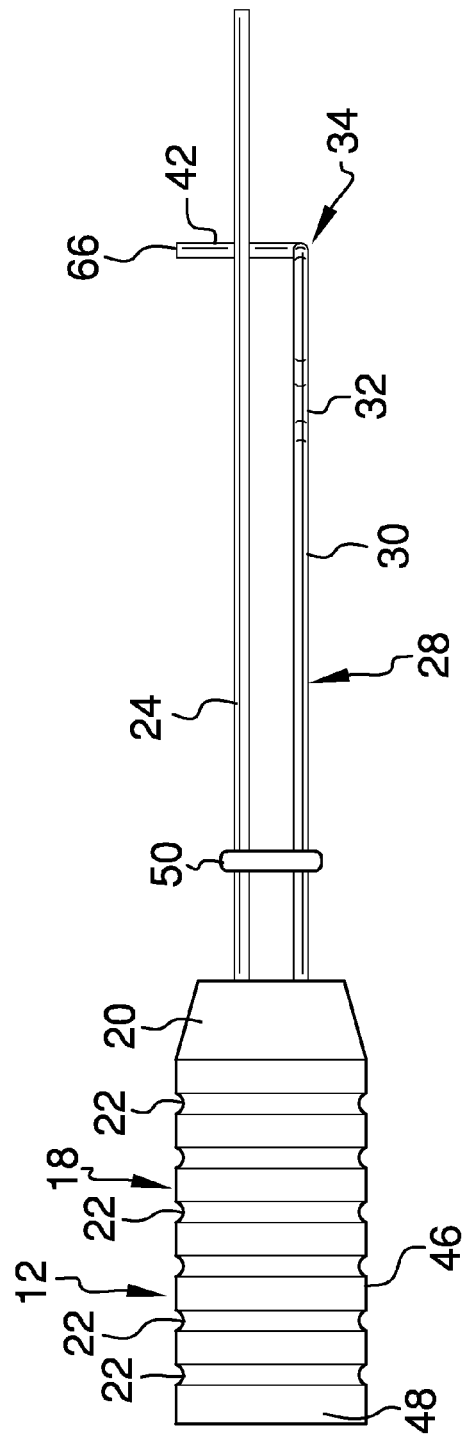

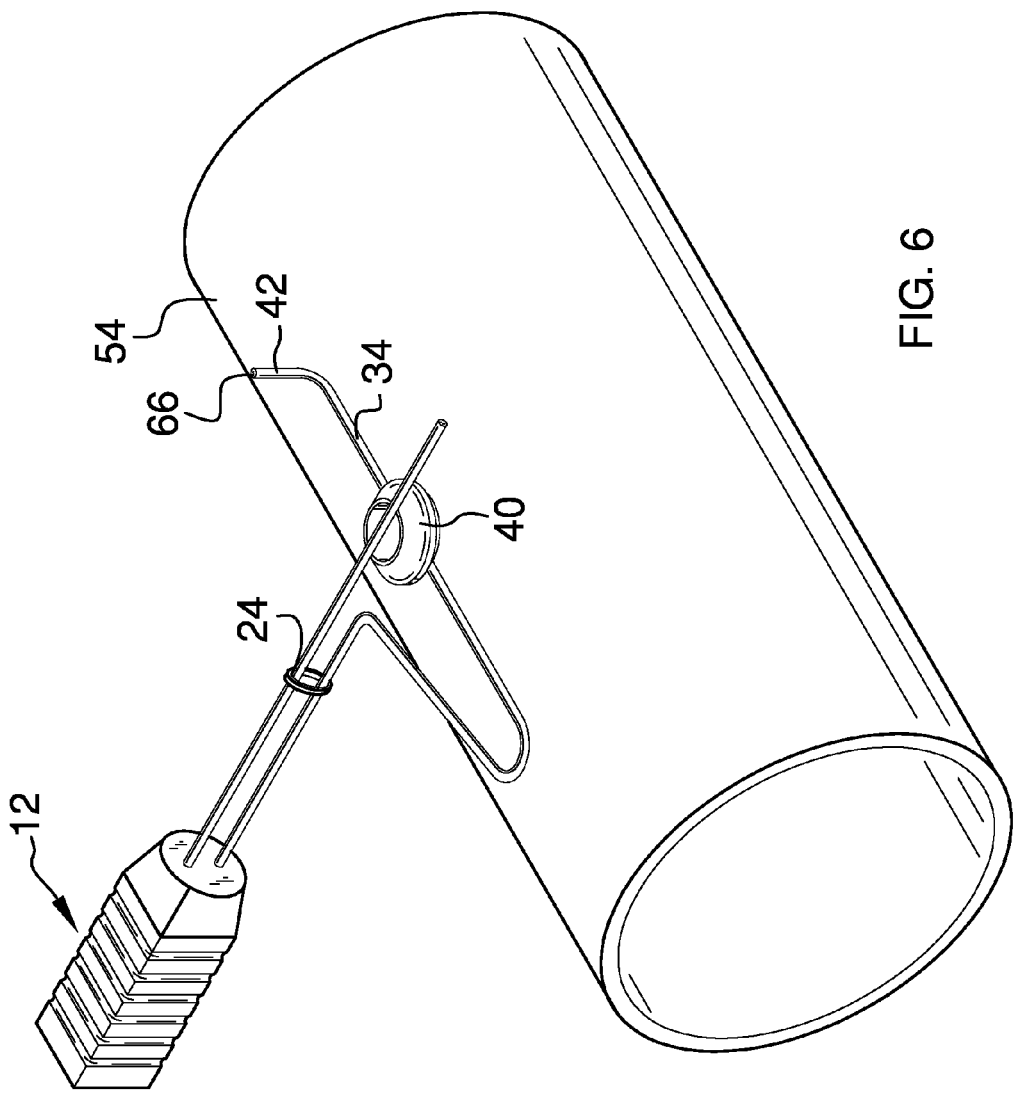

FITTING HOLDING DEVICE

BACKGROUND OF THE DISCLOSURE

Field of the Disclosure

The disclosure relates to holding devices and more particularly pertains to a new holding device for holding an olet fitting in place while tack welding the olet fitting to a pipe.

SUMMARY OF THE DISCLOSURE

An embodiment of the disclosure meets the needs presented above by generally comprising an elongated rectangular handle with a gripping section and a tapered section. A first rod straight rod extends from the handle. A second rod extends from the handle having a first section is coplanar with the first rod, a second section coplanar with respect to the first section and skewed relative to the first rod, a third section coplanar with the second section and the first section and transverse relative to the first rod defining a gap to engage and hold an olet fitting. A cuff is slidable along a length of the first rod and the first section to adjust tension on the olet fitting positioned between the first rod and the third section of the second rod.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a side view of an embodiment of the disclosure.

FIG. 6 is a top front side perspective view of an embodiment of the disclosure.

DESCRIPTION OF THE PREFERRED EMBODIMENT

Figure 1:
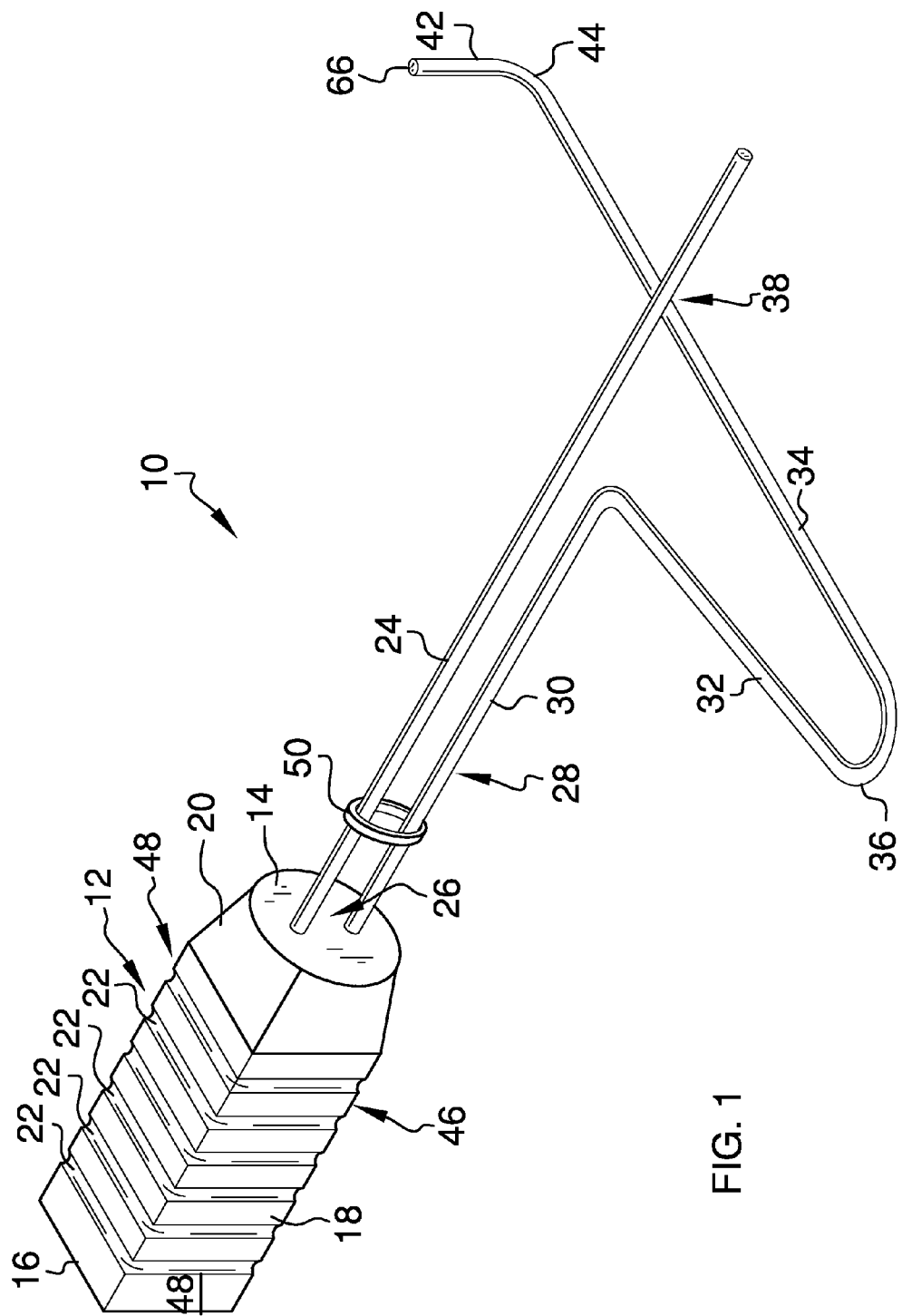
FIG. 1 is a top front side perspective view of a fitting holding device according to an embodiment of the disclosure.
Figure 2:
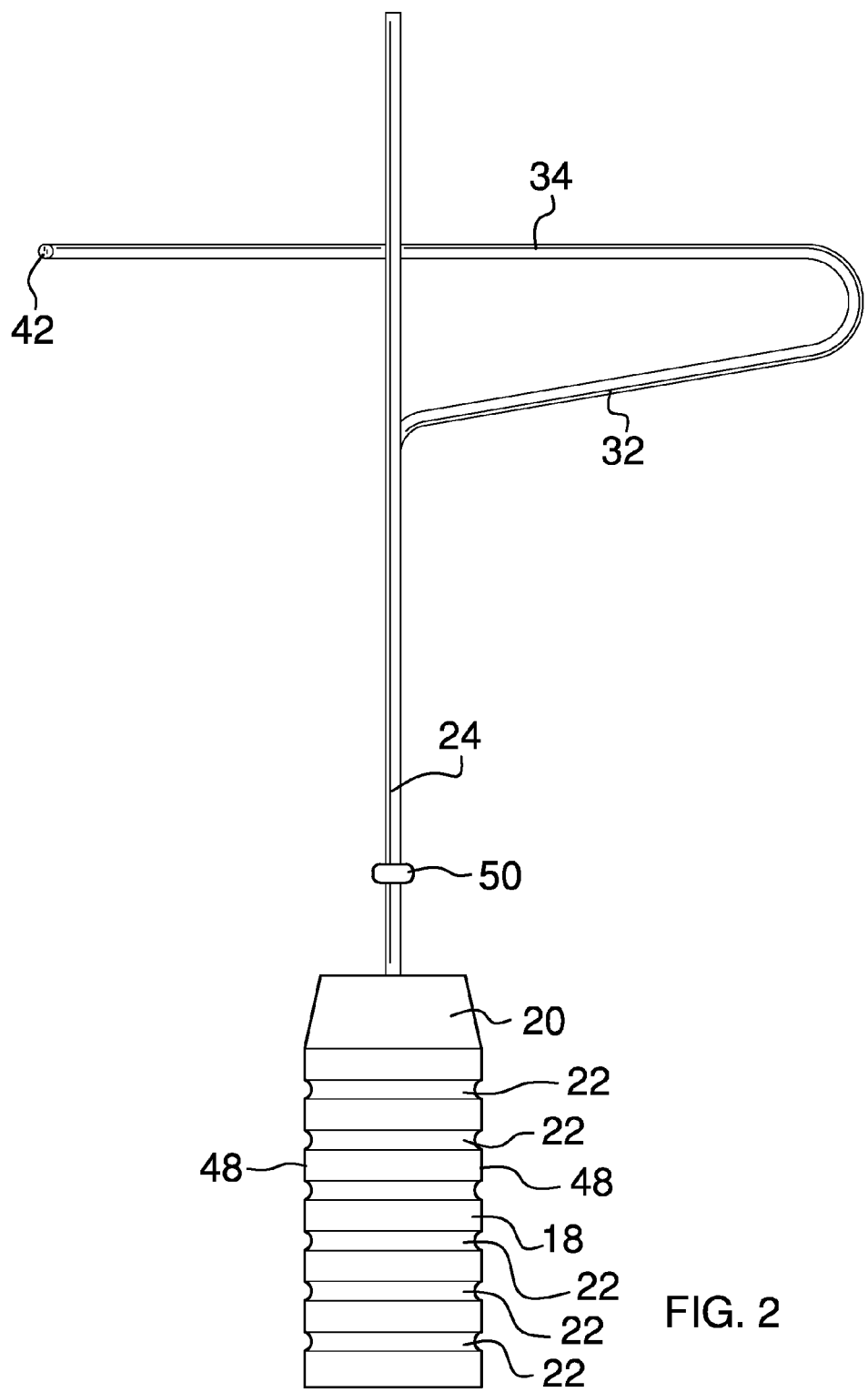
FIG. 2 is a top view of an embodiment of the disclosure.
Figure 5:
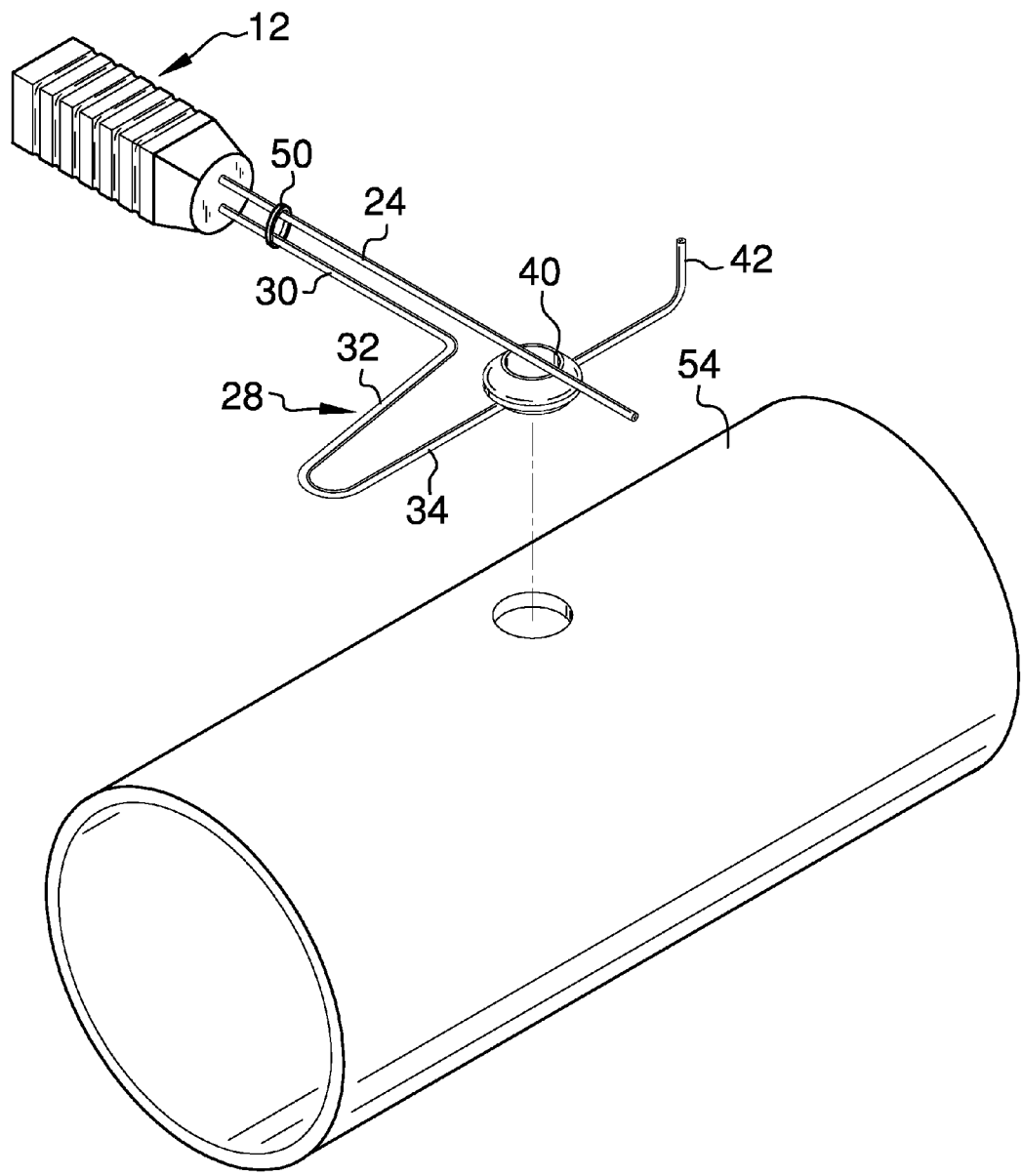
FIG. 5 is a top front side perspective view of an embodiment of the disclosure in use.

With reference now to the drawings, and in particular to FIGS. 1 through 6 thereof, a new holding device embodying the principles and concepts of an embodiment of the disclosure and generally designated by the reference numeral 10 will be described.

As best illustrated in FIGS. 1 through 6, the fitting holding device 10 generally comprises a handle 12 which is elongated between a first end 14 and a second end 16. The handle 12 includes a gripping section 18 and a tapered section 20 extending from the gripping section 18 to the first end 14 of the handle 12. The gripping section 18 has a rectangular cross-sectional shape transverse to a longitudinal axis of the handle 12. The handle 12 is structured to have a plurality of spaced circumferential grooves 22 extending around the gripping section 18 of the handle 12. The circumferential grooves 22 are evenly spaced along the gripping section 18 of the handle 12 between the second end 16 of the handle 12 and the tapered section 20 of the handle 12.

A first rod 24 is coupled to and extends from the first end 14 of the handle 12. The first rod 24 is elongated and straight. The first rod 24 has a consistent cross-sectional shape extending along a length of the first rod 24. The first rod 24 extends from the first end 14 of the handle 12 offset from a center 26 of the handle 12. A second rod 28 is coupled to and extends from the first end 14 of the handle 12. The second rod 28 is elongated having a first section 30 which is coplanar with the first rod 24. The second rod 28 has a second section 32 extending from the first section 30. The second section 32 of the second rod 28 is coplanar with respect to the first section 30. The second section 32 of the second rod 28 is skewed relative to the first rod 24. The second rod 28 includes a third section 34 extending from a distal end 36 of the second section 32 relative to the first section 30. The third section 34 of the second rod 28 is coplanar with the second section 32 and the first section 30 of the second rod 28. The third section 34 is transverse relative to the first rod 24 wherein the third section 34 extends in spaced relationship across from the first rod 24 defining a gap 38 therebetween wherein the first rod 24 and the third section 34 of the second rod 28 are configured to engage and hold an olet fitting 40 therebetween. The third section 34 of the second rod 28 is transverse relative to the handle 12 and is positionable to sit directly on a pipe 54 to facilitate orientation of the olet fitting 40. The second rod 28 includes a fourth section 42 extending from a distal end 44 of the third section 34 relative to the second section 32 and towards the first rod 24. The fourth section 42 is coplanar with the third section 34 and transverse relative to the second section 32 and the first section 30. The fourth section 42 has a distal end 66 extending vertically above the first rod 24 to facilitate visual inspection to assist in orienting the olet fitting 40 in a horizontal plane. A bottom surface 46 of the gripping section 18 of the handle 12 is substantially parallel to the third section 34 of the second rod 28. The gripping section 18 of the handle 12 has longitudinal side surfaces 48 which are transverse to the third section 34 of the second rod 28.

A cuff 50 is coupled to and extends around the first rod 24 and the first section 30 of the second rod 28. The cuff 50 is slidable along a length of the first rod 24 wherein the cuff 50 is configured to adjust tension on the olet fitting 40 positioned between the first rod 24 and the third section 34 of the second rod 28. Sliding the cuff 50 away from the handle 12 increases tension on the olet fitting 40 to securely hold the olet fitting between the first rod 24 and the third section 34 of the second rod 28. Conversely, sliding the cuff 50 back towards the handle 12 reduces tension on the olet fitting 40 allowing the olet fitting 40 to be released from between the first rod 24 and the third section 34 of the second rod 28 without unnecessary stress on a tack weld made between the olet fitting 40 and a pipe 54 while the olet fitting 40 is secured between the first rod 24 and the third section 34 of the second rod 28.

In use, the olet fitting 40 is positioned between the first rod 24 and the third section 34 of the second rod 28. The cuff 50 is positioned to hold the olet fitting 40 securely as described above. One person may hold the handle 12 and position the olet fitting 40 adjacent to a desired position on the pipe 54 while remaining a safe distance from the olet fitting 40 as the olet fitting 40 is tack welded to the pipe 54 by a second person.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fitting holding device comprising:
   a handle, said handle being elongated between a first end and a second end, said handle comprising a gripping section and a tapered section extending from said gripping section to said first end of said handle, said gripping section having a rectangular cross-sectional shaped transverse to a longitudinal axis of said handle;
   a first rod coupled to and extending from said first end of said handle, said first rod being elongated, said first rod being straight, said first rod having a consistent cross-sectional shape extending along a length of said first rod, said first rod extending from said first end of said handle offset from a center of said handle;
   a second rod coupled to and extending from said first end of said handle, said second rod being elongated, said second rod having a first section being coplanar with said first rod, said second rod having a second section extending from said first section, said second section of said second rod being coplanar with respect to said first section, said second section of said second rod being skewed relative to said first rod, said second rod comprising a third section extending from a distal end of said second section relative to said first section, said third section of said second rod being coplanar with said second section and said first section of said second rod, said third section being transverse relative to said first rod wherein said third section extends in spaced relationship across from said first rod defining a gap therebetween wherein said first rod and said third section of said second rod are configured to engage and hold an olet fitting therebetween, said third section of said second rod being transverse relative to said handle; and
   a cuff coupled to and extending around said first rod and said first section of said second rod, said cuff being slidable along a length of said first rod wherein said cuff being configured to adjust tension on said olet fitting positioned between said first rod and said third section of said second rod.

2. The device of claim 1, further comprising said second rod comprising a fourth section extending from a distal end of said third section relative to said second section and towards said first rod, said fourth section being coplanar with said third section and transverse relative to said second section and said first section.

3. The device of claim 1, further comprising said handle being structured to have a plurality of spaced circumferential grooves extending around said gripping section of said handle.

4. The device of claim 3, further comprising said circumferential grooves being evenly spaced along said gripping section of said handle between said second end of said handle and said tapered section of said handle.

5. The device of claim 1, further comprising a bottom surface of said handle gripping section of said handle being substantially parallel to said third section of said second rod.

6. The device of claim 5, further comprising said gripping section of said handle having longitudinal side surfaces being transverse to said third section of said second rod.

7. A fitting holding device comprising:
   a handle, said handle being elongated between a first end and a second end, said handle comprising a gripping section and a tapered section extending from said gripping section to said first end of said handle, said gripping section having a rectangular cross-sectional shaped transverse to a longitudinal axis of said handle, said handle being structured to have a plurality of spaced circumferential grooves extending around said gripping section of said handle, said circumferential grooves being evenly spaced along said gripping section of said handle between said second end of said handle and said tapered section of said handle;
   a first rod coupled to and extending from said first end of said handle, said first rod being elongated, said first rod being straight, said first rod having a consistent cross-sectional shape extending along a length of said first rod, said first rod extending from said first end of said handle offset from a center of said handle;
   a second rod coupled to and extending from said first end of said handle, said second rod being elongated, said second rod having a first section being coplanar with said first rod, said second rod having a second section extending from said first section, said second section of said second rod being coplanar with respect to said first section, said second section of said second rod being skewed relative to said first rod, said second rod comprising a third section extending from a distal end of said second section relative to said first section, said third section of said second rod being coplanar with said second section and said first section of said second rod, said third section being transverse relative to said first rod wherein said third section extends in spaced relationship across from said first rod defining a gap therebetween wherein said first rod and said third section of said second rod are configured to engage and hold an olet fitting therebetween, said third section of said second rod being transverse relative to said handle, said second rod comprising a fourth section extending from a distal end of said third section relative to said second section and towards said first rod, said fourth section being coplanar with said third section and transverse relative to said second section and said first section, a bottom surface of said handle gripping section of said handle being substantially parallel to said third section of said second rod, said gripping section of said handle having longitudinal side surfaces being transverse to said third section of said second rod; and a cuff coupled to and extending around said first rod and said first section of said second rod, said cuff being slidable along a length of said first rod wherein said cuff being configured to adjust tension on said olet fitting positioned between said first rod and said third section of said second rod.

* * * * *